(12) United States Patent
Beaurepaire et al.

(10) Patent No.: US 9,046,124 B2
(45) Date of Patent: Jun. 2, 2015

(54) BEARING ARRANGEMENT

(75) Inventors: Olivier Beaurepaire, Rumilly (FR); Omar Mian, Rugby (GB); Guy Towlson, Leeds (GB)

(73) Assignees: MAHLE International GmbH, Stuttgart (DE); MAHLE Composants Moteur France SAS, Chavanod (FR); MAHLE Engine Systems, Rugby, Warwickshire (GB)

( * ) Notice: Subject to any disclaimer, the term of this patent is extended or adjusted under 35 U.S.C. 154(b) by 54 days.

(21) Appl. No.: 14/001,335

(22) PCT Filed: Feb. 24, 2012

(86) PCT No.: PCT/EP2012/000806
§ 371 (c)(1),
(2), (4) Date: Dec. 27, 2013

(87) PCT Pub. No.: WO2012/113567
PCT Pub. Date: Aug. 30, 2012

(65) Prior Publication Data
US 2014/0126847 A1 May 8, 2014

(30) Foreign Application Priority Data
Feb. 25, 2011 (GB) .................. 1103261.2

(51) Int. Cl.
| F16C 9/02 | (2006.01) |
| F16C 33/10 | (2006.01) |
| F16C 3/14 | (2006.01) |
| F01M 11/02 | (2006.01) |

(52) U.S. Cl.
CPC ............ *F16C 9/02* (2013.01); *F01M 2011/026* (2013.01); *F16C 3/14* (2013.01); *F16C 33/1055* (2013.01); *F16C 33/1085* (2013.01)

(58) Field of Classification Search
CPC .................... F16C 33/1065; F16C 33/1085
USPC .............. 384/286, 288, 291, 294; 123/196 R
See application file for complete search history.

(56) References Cited

U.S. PATENT DOCUMENTS

| 2,081,157 | A | 5/1937 | Swenson |
| 3,343,893 | A * | 9/1967 | Hall ............................ 384/291 |
| 5,799,547 | A | 9/1998 | Agarrat |
| 6,491,438 | B1 * | 12/2002 | Ono et al. .................... 384/288 |
| 6,857,411 | B2 | 2/2005 | Ronneburger et al. |
| 7,077,096 | B2 | 7/2006 | Matsuda |

(Continued)

FOREIGN PATENT DOCUMENTS

| EP | 1 557 544 A1 | 7/2005 |
| EP | 2 141 371 A2 | 1/2010 |

(Continued)

OTHER PUBLICATIONS

International Search Report of PCT/EP2012/000804, Aug. 17, 2012.
(Continued)

*Primary Examiner* — Phillip A Johnson
(74) *Attorney, Agent, or Firm* — Collard & Roe, P.C.

(57) ABSTRACT

A bearing arrangement comprising a bearing shell, and a bearing shell receiving element, wherein the bearing shell is cylindrical or part-cylindrical and has a circumferential oil supply slot, and the bearing shell receiving element has an oil supply channel located in correspondence with the oil supply slot.

17 Claims, 9 Drawing Sheets

(56) References Cited

U.S. PATENT DOCUMENTS

| | | | |
|---|---|---|---|
| 7,201,118 B2* | 4/2007 | Lenz et al. | 123/41.35 |
| 7,281,854 B2 | 10/2007 | Terada et al. | |
| 8,870,460 B2* | 10/2014 | Lehmann et al. | 384/286 |
| 2005/0196084 A1 | 9/2005 | Kitahara et al. | |
| 2006/0104556 A1 | 5/2006 | Tidwell | |
| 2008/0190699 A1* | 8/2008 | Ohta | 184/6.5 |
| 2009/0226123 A1* | 9/2009 | Klein | 384/276 |

FOREIGN PATENT DOCUMENTS

| | | |
|---|---|---|
| FR | 2 858 012 A1 | 1/2005 |
| FR | 2 939 854 A1 | 6/2010 |
| GB | 2 350 652 A | 12/2000 |
| JP | 7-27127 A | 1/1995 |
| JP | 2005-282537 A | 10/2005 |
| JP | 2006-125565 A | 5/2006 |
| WO | WO 02/063143 A1 | 8/2002 |

OTHER PUBLICATIONS

British Search Report of British Application No. GB1103262.0, Jun. 8, 2011.
British Search Report of British Application No. GB1103261.2, Jun. 6, 2011.
Written Opinion of the International Search Authority of PCT/EP2012/000804, Feb. 24, 2012.
Written Opinion of the International Search Authority of PCT/EP2012/000806, Feb. 24, 2012.
International Search Report of PCT/EP2012/000806, Jul. 5, 2012.

* cited by examiner

BEARING ARRANGEMENT

CROSS REFERENCE TO RELATED APPLICATIONS

This application is the National Stage of PCT/EP2012/000806 filed on Feb. 24, 2012, which claims priority under 35 U.S.C. §119 of Great Britain Application No. 1103261.2 filed on Feb. 25, 2011, the disclosures of which are incorporated by reference. The international application under PCT article 21(2) was published in English.

The present invention relates to engine bearing arrangements for internal combustion engines, in particular for use with crankshafts having internal passageways for lubrication oil.

BACKGROUND

The provision of lubrication oil to the main journal bearings and connector rod bearings of a crankshaft is critical to the operation of internal combustion engines. As well as lubricating the relative movement of connected components to reduce wear, oil provides an important cooling function.

Known engines incorporate passageways internal to the engine block through which oil is pumped into main journal bearings of the crankshaft, and internal passageways are provided within the crankshaft between main journal bearings and one, or at most two, adjacent connector rod bearings. The oil flow to the crankshaft bearings is firstly supplied to the main journal bearings from an oil gallery of the engine block, and thence from the main journal bearing to an adjacent connector rod bearing (big end bearing). The oil supply to the oil gallery supplying the main bearings is provided by an oil pump in the engine. Typically the oil is supplied to grooved bearing shells situated in the engine block, whilst the corresponding bearing shells situated in the bearing caps are plain, un-grooved bearing shells. The grooved bearing shell halves are each provided with an oil access hole corresponding in position to the oil supply passageway from the oil supply gallery and a groove around the inner periphery to provide oil into the inputs of the crankshaft's internal passageways to the one or more adjacent connector rod bearings. Disadvantageously, oil pumps for pumping oil into the lubrication system are heavy, bulky, and consume a large amount of energy. Further, the grooved bearing shell that is required at each main journal bearing leaks more oil than a plain bearing shell, increasing oil flow and the necessary pumping rate and power consumption of the oil pump.

Engines having known bearing arrangements are disclosed in JP07027127A and U.S. Pat. No. 7,281,854B2.

JP07027127A discloses crankshaft lubrication arrangements in which main journal bearings are fed with oil by oil supply passageways internal to the engine block, and the connector rod bearings are each fed with oil from main journal bearings through internal passageways of the crankshaft.

In a first arrangement of JP07027127A, an internal oil feed passageway leads from each of the main journal bearings on either side of each connector rod bearing to the respective connector rod bearing. One half of each of the main journal bearings has a semi-cylindrical bearing shell with a semi-cylindrical groove into which oil is pumped through an internal passageway of the engine block, and from which oil is fed into an internal passageway to a connector rod bearing. In this arrangement, alternate main journal bearings alternately have such semi-cylindrical grooves provided in their upper and lower semi-cylindrical bearing shells, and oil is fed to each connector rod bearing from the two adjacent main journal bearings during alternating halves of a complete rotation of the crankshaft.

Disadvantageously, this first arrangement requires every main journal bearing to be provided with a semi-cylindrical bearing shell with a semi-cylindrical groove. Such bearing shells are more expensive than plain bearing shells and leak more oil. For example, in the case of a four cylinder engine according to this design, each of the five main journal bearings requires to be provided with such a bearing shell.

Further, disadvantageously, this first arrangement requires an oil supply passageway to each main journal bearing to be provided in the engine block. The provision of such oil supply passageways in the engine block increases the complexity and manufacturing cost of the engine block. For example, in the case of a four cylinder engine according to this design, having five main journal bearings, five oil supply passageways are required in the engine block.

In a second arrangement of JP07027127A, two internal oil feed passageways lead from alternate main journal bearings to feed oil to the connector rod bearings. One internal passageway leads to each of the connector rod bearings on either side of each of the oil feeding main journal bearings. Again, each of the oil feeding main journal bearings has a semi-cylindrical bearing shell with a semi-cylindrical groove into which oil is pumped through an internal passageways of the engine block. However, both the oil feeding main journal bearings and those main journal bearings that do not feed oil into internal passageways of the crankshaft require to be supplied with oil by oil supply passageways from the oil gallery to provide lubrication.

In this second arrangement, the number of oil feeding main journal bearings is lower than in the first arrangement. However, disadvantageously, in this second arrangement, it is still required that approximately half of the main journal bearings are oil feeding main journal bearings, each of which has a corresponding semi-cylindrical bearing shell with a semi-cylindrical groove. For example, in a four cylinder engine, at least two of the five main journal bearings require to be oil feeding main journal bearings having such a grooved bearing shell, and to be fed through five oil supply passageways in the engine block. In a further example in an engine having six cylinders served by a common crankshaft, at least three of the seven main journal bearings require to be oil feeding main journal bearings having such a grooved bearing shell, and to have seven oil supply passageways.

Further, disadvantageously, this second arrangement still requires an oil supply passageway to be provided in the engine block to each main journal bearing (both the oil feeding main journal bearings and the non-oil feeding main journal bearings). For example, for a four cylinder engine, an oil supply passageway is required for each of the five main journal bearings. Similarly, in an engine having six cylinders served by a common crankshaft, an oil supply passageway is required for each of the seven main journal bearings.

U.S. Pat. No. 7,281,854B2 discloses an engine lubrication arrangement similar to the second arrangement of JP07027127A, described above.

A cross-sectional view of part of a known engine is shown, having several bearing arrangements, is shown in FIG. 1A, with the cross-sectional view being coplanar with the axis of rotation of a crankshaft within the bearing arrangements. The crankshaft 100 has main journal bearing sections 102A to 102C, connector rod bearing sections 104A and 104B, web sections 106, a crankshaft end portion 108, and an oil feed passageways 110. Also shown are corresponding plain bearing shells 112 and a grooved bearing shell 114, which line the bearing housings (bearing shell receiving elements) 117 and 121 of the engine block and cylinder head respectively, and an oil supply passageway 116 within the engine block bearing housing.

The plain bearing shells 112 are concave and substantially semi-cylindrical such that their inner surfaces mate with the bearing surfaces of the main journal bearing sections 102A to 102C. The concave grooved bearing shell 114 is illustrated in FIG. 1B and differs from a plain bearing shell 112 by inclusion of a semi-cylindrical groove 118 on the inner surface and a supply hole 119, which communicates between the groove 118 and the oil supply passageway 116 of the bearing housing 117 of the engine block, such that oil supplied through the oil supply passageway is received into a chamber formed between the groove and the surface of the main journal bearing section 102A.

The oil feed passageways 110 have interconnecting straight bores formed in different sections 102, 104 and 106 of the crankshaft 100. The oil feed passageways 110 each have one inlet 122 and two outlets 124. The inlet 122 is in a first side of a main journal bearing surface 102B and 102C. The first outlet is in an opposite side of corresponding main journal bearing surface 102B an 102C, and a second outlet is in the surface of a connector rod bearing section 104A and 104B. In the case that the crankshaft is formed by assembly of separate sections, the straight bores may be conveniently bored into the sections before assembly.

The oil enters the inlet 122 at a pressure sufficient to force the oil along the oil feed passageway 110 and out through the outlets 124.

Optionally the crankshaft 100 has a direction of rotation in use, and the inlet 122 is shaped to draw in oil into the oil feed passageway 110 from the groove 118, and the outlets 124 are shaped to draw oil out of the oil feed passageway 110 into the bearing gaps between the crankshaft 100 and the plain bearing shells 112 to lubricate the bearings.

A need remains for a crankshaft for an engine lubrication arrangement having reduced numbers of oil feeding main journal bearings. Further, a need remains for a crankshaft for an engine lubrication arrangement requiring a reduced number of oil supply passageways provided in the engine block.

The Applicant has appreciated that a limitation upon the number of bearing shells that may each be adequately supplied with oil from an outlet 124 of an oil supply passageway 110 is the amount of oil that the oil supply passageway is able to deliver. In turn, the Applicant has also appreciated that a limitation upon the delivery of sufficient oil by the oil supply passageway is the pressure at which oil is provided to the inlet 122 of the oil supply passageway 110, throughout the rotation cycle of the crankshaft.

Accordingly a need remains in for an engine bearing arrangement in which oil is supplied to the inlet of an oil supply passageway 110 at higher pressures throughout the rotational cycle of a crankshaft than in known arrangements.

SUMMARY OF THE DISCLOSURE

According to a first aspect of the present invention, there is provided a bearing arrangement comprising a bearing shell, and a bearing shell receiving element, wherein the bearing shell is cylindrical or part-cylindrical and has a circumferential oil supply slot through the bearing shell, and the bearing shell receiving element has an oil supply channel located in correspondence with the oil supply slot.

According to a second aspect of the present invention, there is provided an engine or compressor comprising a bearing arrangement comprising a bearing shell, and a bearing shell receiving element, wherein the bearing shell is cylindrical or part-cylindrical and has a circumferential oil supply slot through the bearing shell, and the bearing shell receiving element has an oil supply channel located in correspondence with the oil supply slot.

According to a third aspect of the present invention, there is provided a vehicle comprising a bearing arrangement comprising a bearing shell, and a bearing shell receiving element, wherein the bearing shell is cylindrical or part-cylindrical and has a circumferential oil supply slot through the bearing shell, and the bearing shell receiving element has an oil supply channel located in correspondence with the oil supply slot.

Advantageously, the oil supply channel may provide enhanced oil distribution with respect to a known grooved bearing shell, whilst also being convenient to manufacture, and without increasing the flow (volume) of oil entrained by the lubrication system by a significant extent.

Advantageously, a bearing shell having an oil slot can conveniently be provided in place of the conventional grooved bearing shell without an increase in manufacturing or assembly complexity, with respect to the bearing shell, and whilst maintaining structural integrity between the portions of the bearing shell on opposite sides of the slot.

The oil supply channel may be circumferential with respect to the bearing shell.

The bearing arrangement may comprise a plurality of part cylindrical bearing shells.

Each part cylindrical bearing shell may have a circumferential oil supply slot.

The bearing shell may be concave and semi-cylindrical. The bearing shell may be hollow and fully-cylindrical.

The bearing arrangement may comprise a plurality of bearing shell receiving elements.

Each bearing shell receiving element may have an oil supply channel.

The oil supply channels may form a composite oil supply channel.

The oil supply channel may extend circumferentially to the same extent as the oil supply slot. Alternatively, the oil supply channel may extend circumferentially around 180° or 360°.

The oil supply channel may have a width in the range of 10 to 40% of the bearing width, and preferably 20 to 25%. A greater depth of oil supply channel provides a greater cross-sectional area, advantageously further reducing the resistance to oil flow.

In the case of semi-cylindrical bearing shells, the circumferential extent of the slot in the bearing shell may be in the range 90 to 160°, and preferably 120 to 150°. In the case of a fully-cylindrical bearing shell, the bearing shell may have a plurality of circumferential slots.

The oil supply channel may have a region of greater cross-sectional area adjacent an oil supply passageway of the bearing shell receiving element than remote from the oil supply passageway.

The engine or compressor may further comprise a crankshaft, the crankshaft comprising: a plurality of main journal bearing surfaces, a plurality of connector rod journal bearing surfaces, and an oil feed passageway internal to the crankshaft and communicating with an inlet located within a main journal bearing surface and an outlet located within a journal bearing surface.

The oil feed passageway may communicate with a plurality of outlets located within journal bearing surfaces.

At least one of the outlets may be located within a further main journal bearing surface.

The provision of an oil feed passageway internal to the crankshaft can enable several journal bearings to be lubricated by oil provided to a single inlet. In particular, an outlet of the oil feed passageway may be provided in the bearing surface of a main journal bearing, such that the main journal bearing can be lubricated by oil fed through the oil feed passageway. Advantageously, the provision of lubrication to the further main journal bearing through the oil feed passageway enables that further main journal bearing to operate without the provision of a separate oil supply passageway to it within the engine block, bearing cap or oil tray. Such an arrangement reduces the manufacturing complexity and cost of the engine block, bearing cap or oil tray.

Further, an oil feed passageway having an inlet within the bearing surface of a first main journal bearing may provide lubrication to all of the remaining main journal bearings along the path of the oil feed passageway, such that an oil supply passageway of the engine block or cylinder head is only required to that main journal bearing. Such an arrangement further reduces the manufacturing complexity and cost of the engine block, bearing cap or oil tray. Advantageously, the bearing arrangement of the present invention facilitates the use of such crankshafts.

Advantageously, the bearing lubrication of the present bearing arrangement may require less oil flow than existing arrangements, thus enabling the use of smaller and lighter pumps that have a lower maximal oil flow rate.

Advantageously, the oil supplied through the oil supply passageway passes into and flows around within the oil supply slot of the bearing shell and the corresponding oil supply channel of the bearing housing. Advantageously, the composite chamber formed by the slot in the bearing shell and the channel in the bearing housing may have a larger cross-sectional area than a known oil supply groove in a bearing shell alone, providing a better supply of oil to the bearing and associated oil feed passageway. Further, the combined slot and channel may be deeper, and so may provide a comparable cross-sectional area by means of a narrower slot, thereby reducing the amount of the bearing surface of the bearing shell that is taken up with oil distribution, accordingly reducing wear in the bearing.

Where the oil supply slot in the bearing shell and the oil supply channel in the bearing housing abut they may be of substantially equal width. The oil supply channel in the bearing housing may be parallel-sided.

At least part of the oil supply channel may be wider than the slot in the bearing shell. For example, the oil supply channel in the bearing housing may increase in width away from the bearing shell. Advantageously this may provide a further enhanced supply of oil to the bearing.

BRIEF DESCRIPTION OF THE DRAWINGS

Embodiments of the invention are further described hereinafter with reference to the accompanying drawings, in which.

DETAILED DESCRIPTION

In the described embodiments, like features have been identified with like numerals, albeit in some cases having one or more of: being incremented by an integer multiple of 100, and a suffix letter. For example, the bearing arrangements are indicated by 270A and 270B in FIG. 2A, 270 in FIG. 2B, 370 in FIG. 3, 470 in FIG. 4, and 570 in FIG. 5.

Figure 1A:
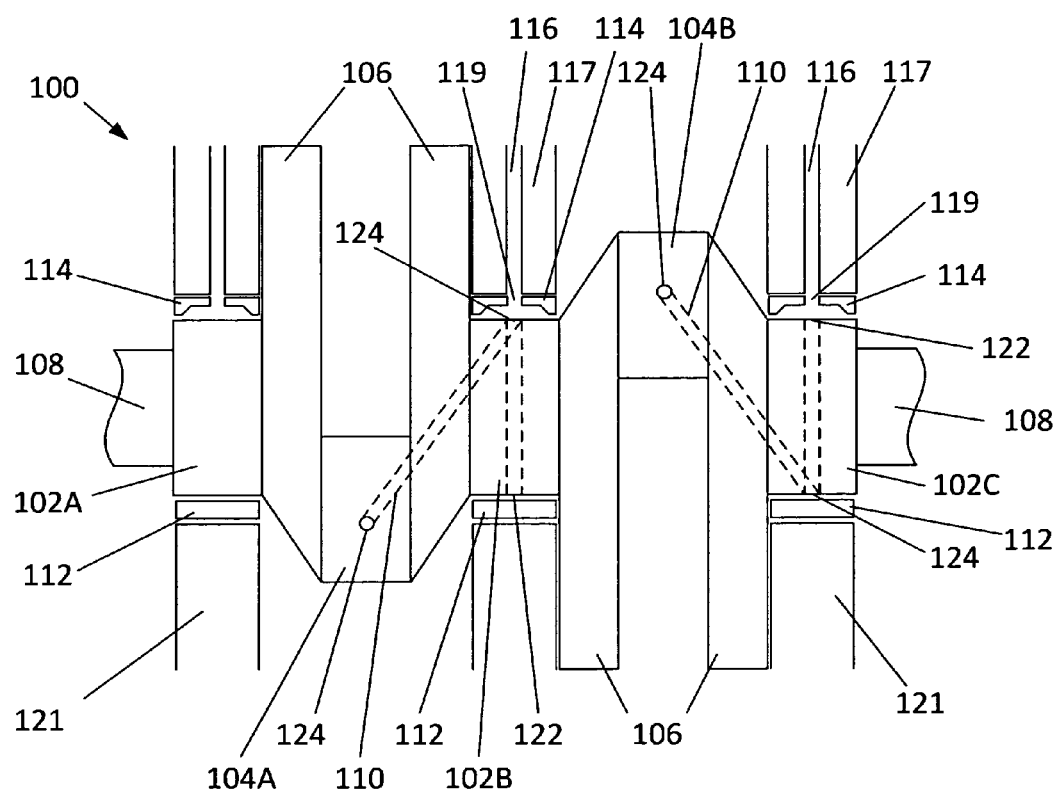
FIG. 1A shows a known bearing arrangement.
Figure 1B:
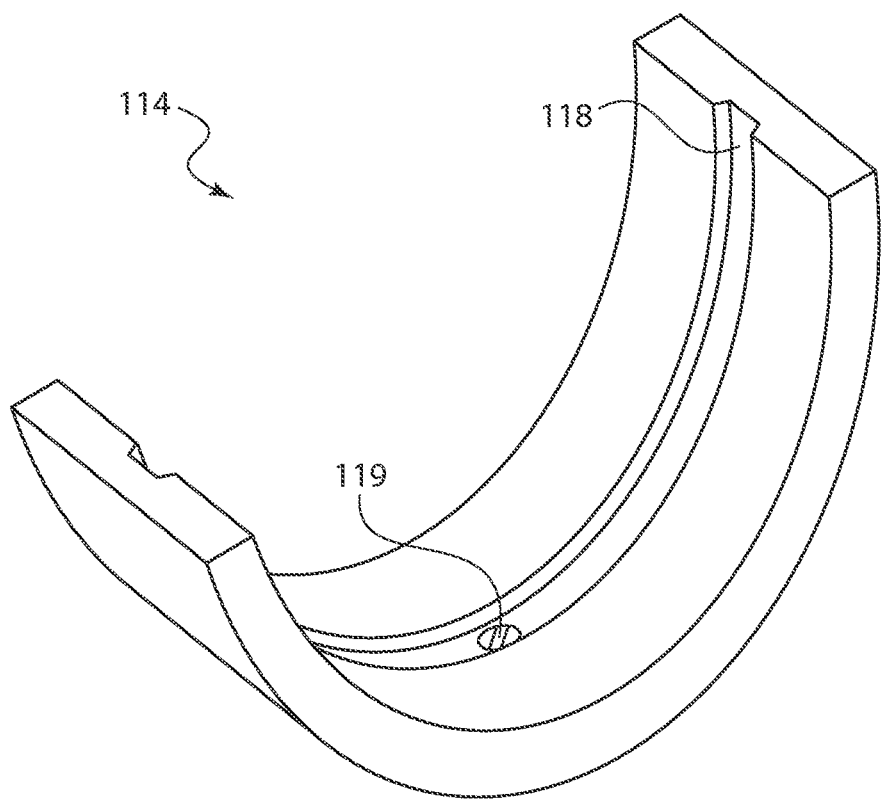
FIG. 1B shows a known grooved bearing shell.
Figure 2A:
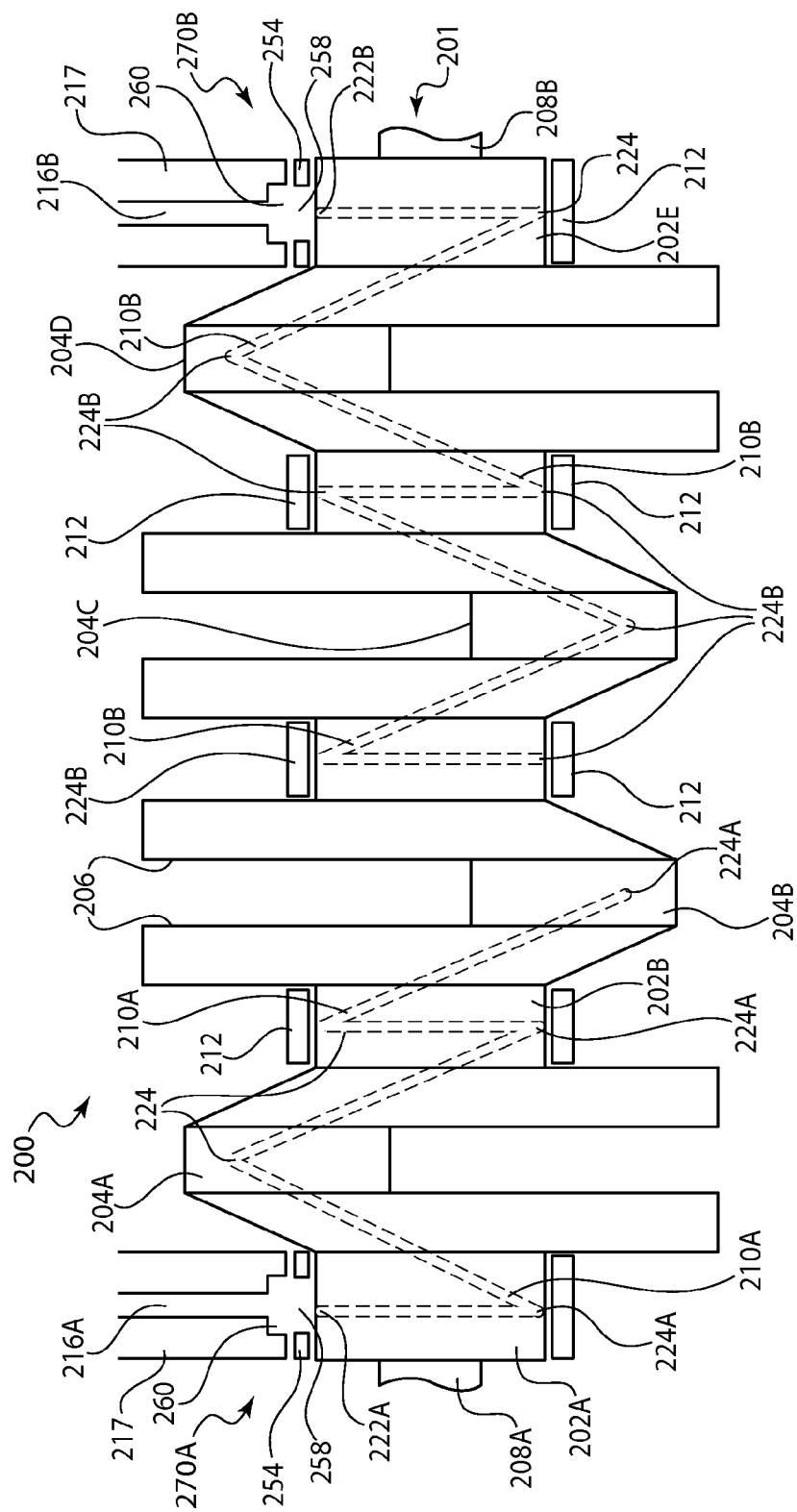
FIG. 2A shows a bearing arrangement according to the present invention.
Figure 2B:
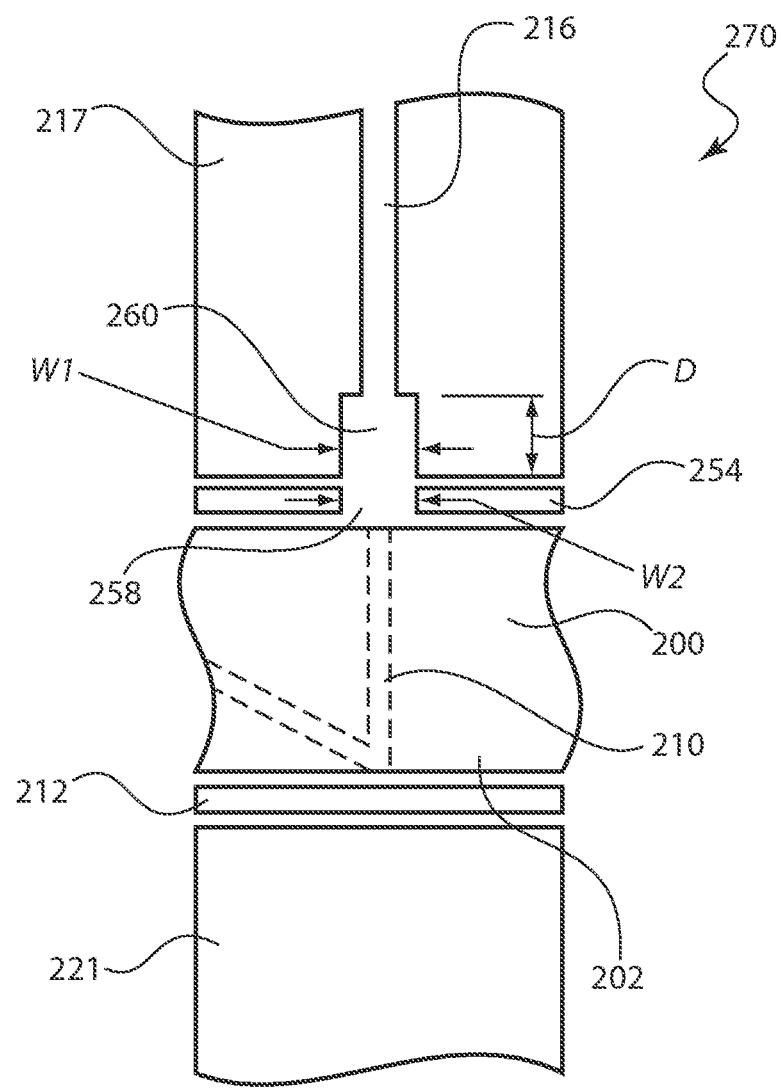
FIG. 2B shows a bearing arrangement according to the present invention.
Figure 2C:
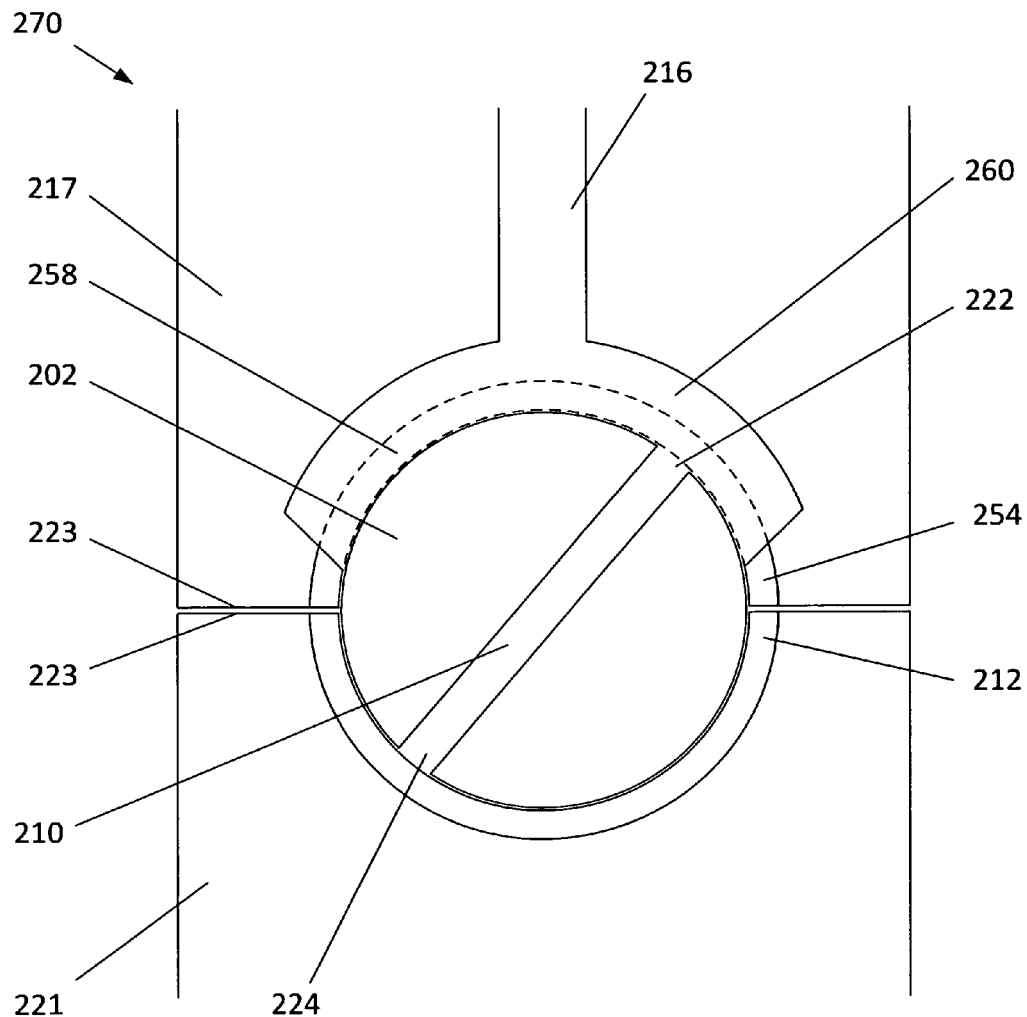
FIG. 2C shows a bearing arrangement according to the present invention.
Figure 2D:
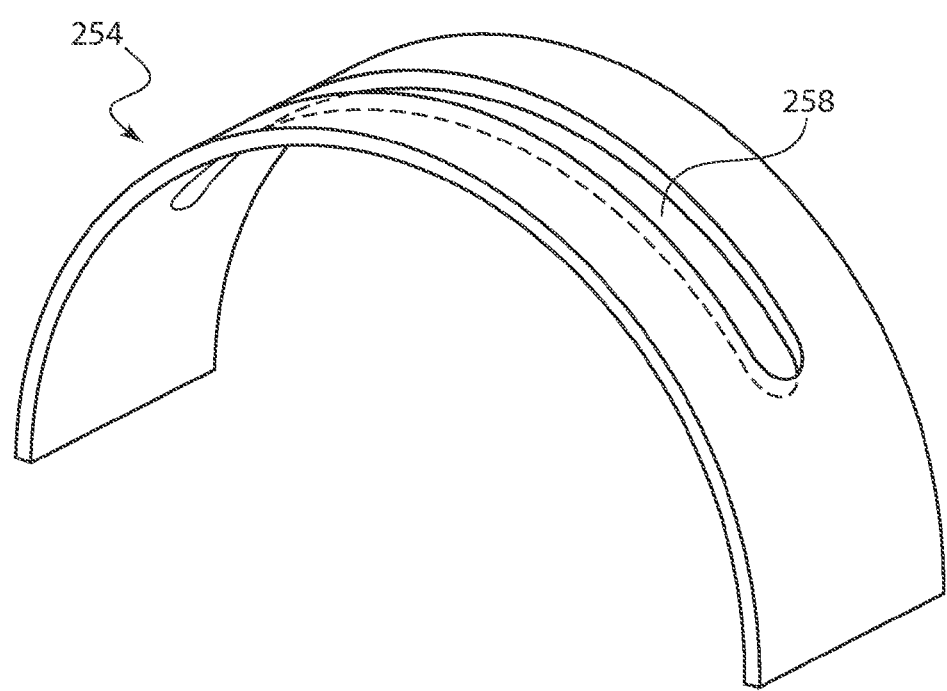
FIG. 2D shows slotted bearing shell suitable for use with a bearing arrangement of the present invention.

Referring now to FIG. 2A to 2D of the drawings: FIG. 2A illustrates a cross-sectional view (coplanar with the axis of rotation of the crankshaft 200 within the bearing arrangements 270A and 270B) of part of an engine having bearing arrangements 270A and 270B in accordance with the present invention. FIG. 2B shows an enlarged view of a bearing arrangement in accordance with the present invention. FIG. 2C shows a cross-sectional view (perpendicular to the axis of rotation) of a bearing arrangement according to the present invention, and FIG. 2D shows a slotted bearing shell 254.

The engine 200 comprises a crankshaft 201, plain bearing shells 212 and slotted bearing shells 254 of the engine block and cylinder head (not shown), oil supply passageways 216A and 216B, and a bearing housing comprising bearing shell receiving elements (bearing housings) 217 and 221.

The bearing arrangements 270A and 270B comprise slotted bearing shells 254 and corresponding oil supply channels 260 in the engine block. The oil supply channels 260 are conveniently of a substantially constant cross-section, with a substantially uniform width W1 and depth D, and viewed axially they describe a space that is generally shaped like a portion of an annulus. The circumferential extent of the oil supply channel of FIG. 2C is between 90 and 160°. Alternatively, the oil supply channel 260 may advantageously extend to the joint faces 223 (contact area between the two bearing housing elements), having a circumferential extent of 180°, for ease of manufacture.

As shown in FIG. 2D, the slotted bearing shells 254 are concave and substantially semi-cylindrical such that their inner surfaces mate with the bearing surfaces of a main journal bearing sections. The slotted bearing shell 254 has an elongate slot 258, which communicates with the oil supply passageway 216 of the engine block through the oil supply channel 260.

The crankshaft 201 comprises main journal bearing sections 202A to 202E, connector rod bearing sections 204A to 204D, web sections 206, crankshaft end portions 208A and 208B and oil feed passageways 210A and 210B. The crankshaft 200 is suited for use within a four cylinder engine, with four connector rods (not shown) being coupled about the four connector rod bearing sections 204A to 204D. The main journal bearing sections 202A to 202E are retained within the bearing shells 212 and 214 of the engine block and cylinder head.

The oil feed passageways 210A and 210B have a series of interconnecting straight bores formed in the different sections 202, 204 and 206 of the crankshaft 201. The oil feed passageways 210A and 210B each have an inlet 222A and 222B and a plurality of outlets 224A and 224B, respectively. The inlets 222A and 222B and outlets 224A and 224B are distributed serially along the oil feed passageways 210A and 210B. In the case that the crankshaft is formed by assembly of separate sections, the straight bores may be conveniently bored into the sections before assembly.

In a car engine, the diameter of the main journal bearing sections 202A to 202E may be about 50 to 70 mm. The bearing shells 254 have an axial length of about 16 to 25 mm, and a radial thickness of about 1.5 to 4.0 mm (modern engines typically use bearing shells having a thickness of about 2.0 to 2.5 mm). The slot 258 is about 2 to 5 mm wide (axial dimension), and may extend around between about 50 and 90% of the circumferential extent of the bearing shell 254.

Although the invention is described with respect to a four cylinder engine 200 having two oil feed passageways 210A and 210B, it will be understood that the present invention is applicable to engines having other numbers of cylinders and different numbers of oil feed passageways. For example the present invention may be applied to an engine in which each main journal bearing has a bearing arrangement and an inlet to an oil feed passageway in a corresponding main journal bearing surface that connects to an outlet in a connector rod bearing surface. In a further example, an engine may have a single oil feed passageway inlet connected to outlets in all of the remaining main journal bearings and connector rod bearings.

Conveniently, the oil supply channels may be integrally formed within the bearing housing during casting of the bearing housing.

In use, oil is pumped from an oil supply gallery (not shown) through the oil supply passageways 216A and 216B to a composite chamber defined by both the oil supply channels 260 and the slot 258 in the slotted bearing shell 254.

As the crankshaft 201 rotates such that the oil inlets 222A and 222B of the oil feed passageways align with the oil supply slot 258, oil present within the slot and oil supply channel 260 enters the inlet and passes along the oil feed passageway, and exits through the outlets 224A and 224B to lubricate the corresponding bearings.

Advantageously, the cross-sectional area of the composite chamber (coplanar with the axis of rotation of the main journal bearing section 202) is large enough that, in use, oil is able to flow through the oil supply channel 260 and slot 258 with a low resistance to oil flow, such that there is a low pressure drop between the outlets of the oil supply passageways 216A and 216B and the surfaces of the crankshaft 201, even when the oil inlets 222A and 222B of the oil supply passageways are aligned within the ends of the slots 258. Such an arrangement provides oil to the oil inlets 222A and 222B with a low pressure drop, thus providing an enhanced oil pressure at the oil outlets 224.

Although in FIG. 2A, two of an inlet 222 or outlet 224 are provided in each of the main journal bearing sections 102A to 102E, it will be appreciated that alternative numbers of inlets or outlets may be provided in each main journal bearing section. For example, the crankshaft may be arranged such that only a single inlet of the oil feed passageway is provided, being in a first main journal bearing section, and a single outlet of the oil feed passageway is provided in each of the other main journal bearing sections.

Although in the oil supply passageway 216A and 216B of FIG. 2A are within the engine block, it will be appreciated that it is within the scope of the present invention for the oil supply passageways to be provided within the bearing cap and/or oil tray of the engine.

Figure 3:
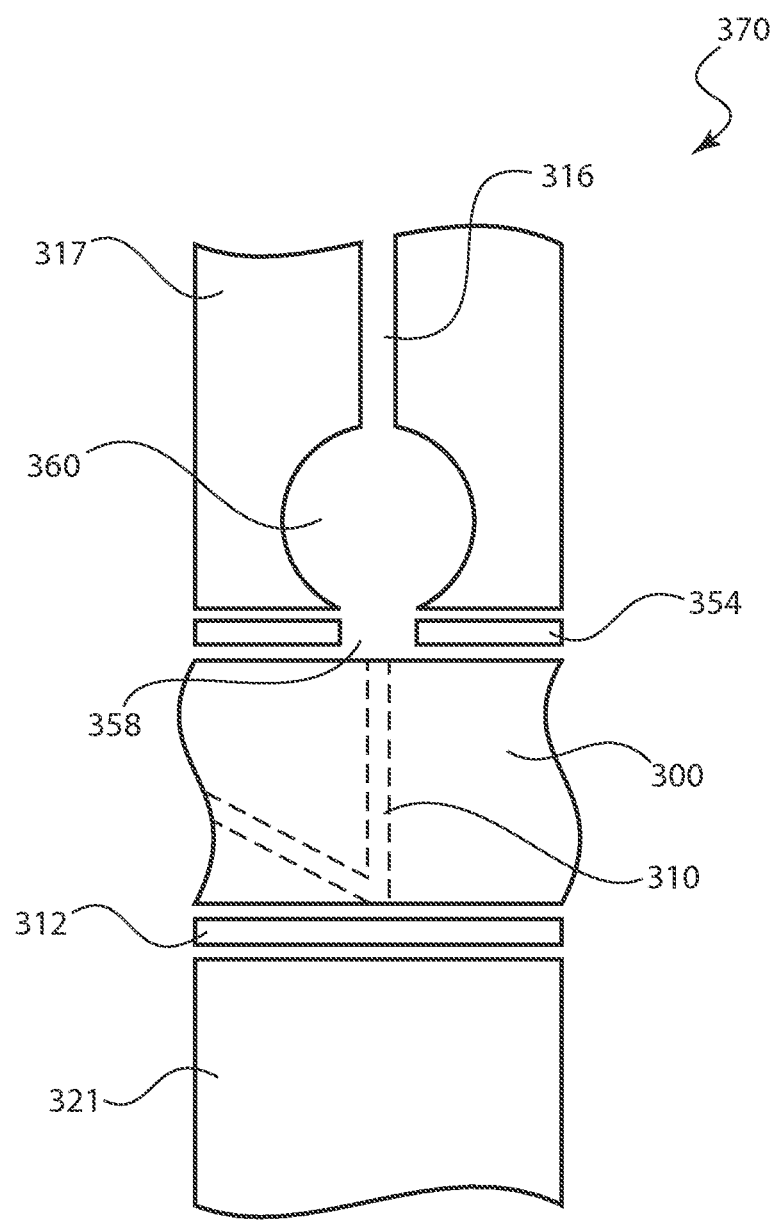
FIG. 3 shows a bearing arrangement according to the present invention.

In a further embodiment, the oil supply channels may have a non-uniform width, for example having a circular cross-sectional shape 360, as shown in the bearing arrangement 370 of FIG. 3 (a cross-sectional view coplanar with the axis of rotation of the crankshaft 300). Advantageously, the provision of an enhanced cross-sectional area of the oil supply channel can further enhance oil distribution to the oil supply passageways.

In a yet further embodiment, a bearing arrangement (not illustrated) has two slotted bearing shells, with a separate oil supply channel provided in correspondence with each slotted bearing shell. Such oil supply channels may be separate, or may inter-connect to form a composite oil supply channel. Such oil supply channels may have a circumferential extent of less than 180°. Alternatively oil supply channels may extend to the joint faces. Advantageously, such an arrangement can provide a further enhanced oil supply to the oil feed passageways.

The oil supply channels may be shaped to further enhance distribution of oil from the oil supply passageways, for example by having a greater depth D closer to the oil supply passageway than away from it.

Figure 4:
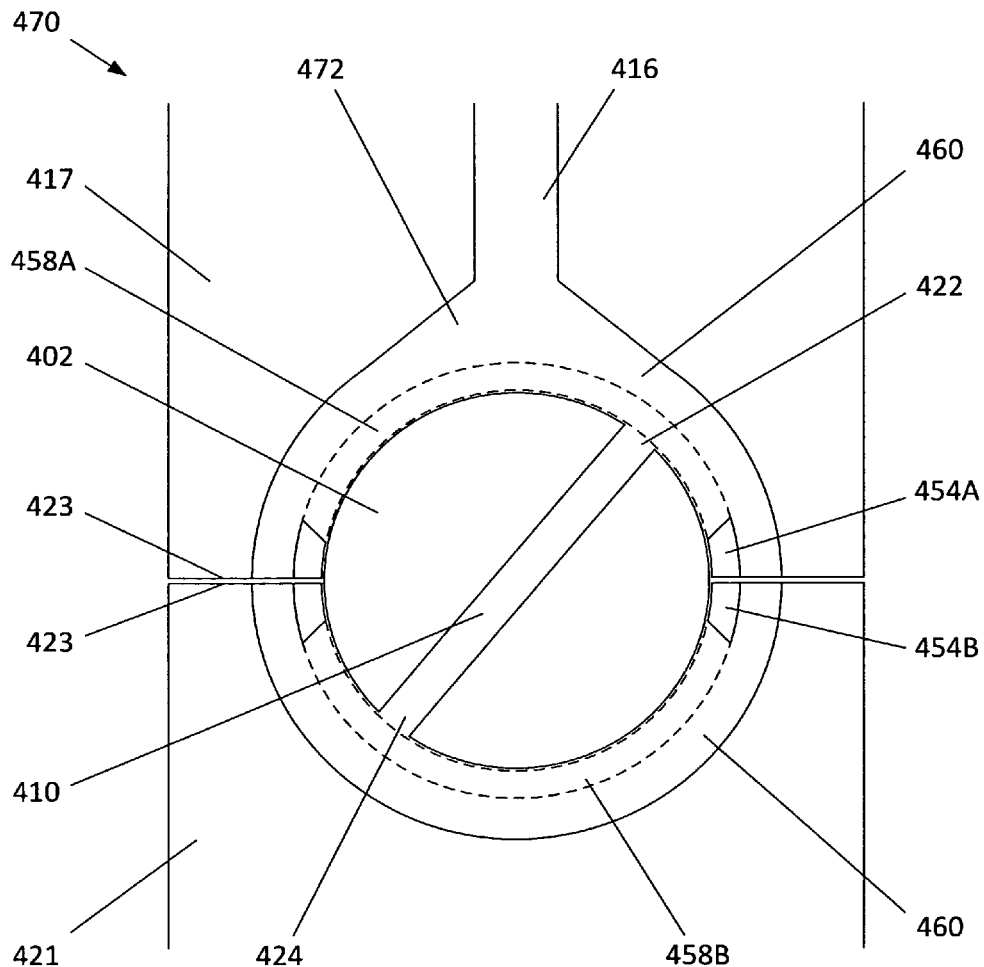
FIG. 4 shows a bearing arrangement according to the present invention.

FIG. 4 illustrates a cross-sectional view (perpendicular to the axis of rotation of the crankshaft 400) through an embodiment, in which the bearing arrangement 470 has two slotted bearing shells 454A and 454B and a composite oil supply channel 460 formed by an oil supply channel in each bearing housing (bearing shell receiving elements) 417 and 421 that has a circumferential extent of 180°, such that it extends to the joint faces 423. Advantageously, such an arrangement provides a further enhanced oil supply to the oil feed passageways. Further advantageously, the composite oil supply channel 460 within both parts of the bearing housing 417 and 421 is supplied with oil from a common oil supply passageway 416. Yet further, advantageously, such an oil supply channel 460 may be more easily manufactured. Advantageously, adjacent the oil supply passageway 416, the oil supply channel 460 has a region 472 of greater depth than elsewhere, to better enhance the distribution of oil from the oil supply passageway.

Although in the FIGS. 2A to 4 have illustrated the present invention with respect to semi-cylindrical bearing shells, the invention is also applicable to other part-cylindrical or fully cylindrical bearing shells. For example a bearing shell may comprise three part-cylindrical bearing shells each having a circumferential extent of 120°.

Figure 5:
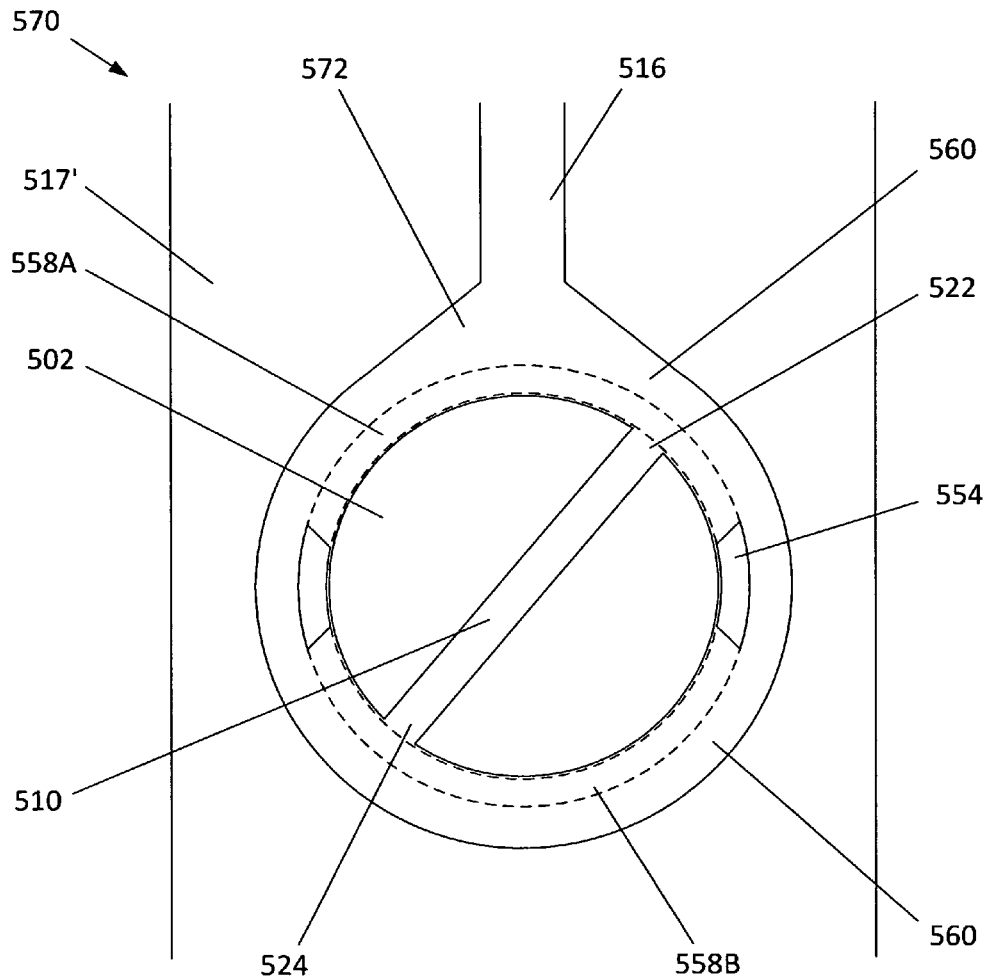
FIG. 5 shows a bearing arrangement according to the present invention.

FIG. 5 illustrates a cross-sectional view of a further embodiment of the present invention in which the bearing arrangement 570 comprises a hollow, fully-cylindrical bearing shell 554 having elongate circumferential slots 558A and 558B and a fully-annular oil supply channel 560*mm* (i.e. circumferential extent of 360°) provided in a single bearing housing 517'.

The present invention also encompasses both an engine having a bearing arrangement and a vehicle (not shown) having such an engine.

The figures provided herein are schematic and not to scale.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A bearing arrangement comprising
   a bearing shell, and
   a bearing shell receiving element, wherein
   the bearing shell is cylindrical or part-cylindrical and has a circumferential oil supply slot through the bearing shell, and
   the bearing shell receiving element has an oil supply channel that is circumferential with respect to the bearing shell and is located in correspondence with the oil supply slot, wherein at least part of the oil supply channel is wider than the oil supply slot.

2. The bearing arrangement according to claim 1, wherein the bearing shell comprises a plurality of part cylindrical bearing shells.

3. The bearing arrangement according to claim 2, wherein each part cylindrical bearing shell has a circumferential oil supply slot.

4. The bearing arrangement according to claim 1, wherein the bearing shell is semi-cylindrical.

5. The bearing arrangement according to claim 1, wherein the bearing shell receiving element comprises a plurality of bearing shell receiving elements.

6. The bearing arrangement according to claim 5, wherein each bearing shell receiving element has an oil supply channel.

7. The bearing arrangement according to claim 6, wherein the oil supply channel of each bearing receiving element forms a composite oil supply channel.

8. The bearing arrangement according to claim 2, wherein the oil supply channel extends circumferentially to the same extent as the oil supply slot.

9. The bearing arrangement according to claim 2, wherein the oil supply channel extends circumferentially around 180°.

10. The bearing arrangement according to claim 2, wherein the oil supply channel extends circumferentially around 360°.

11. The bearing arrangement according to claim 1, wherein the oil supply channel has a width in the range of 10 to 40% of the width of the bearing shell.

12. The bearing arrangement according to claim 1 wherein the oil supply channel has a region of greater cross-sectional area adjacent an oil supply passageway of the bearing shell receiving element than remote from the oil supply passageway.

13. An engine or compressor comprising a bearing arrangement according to claim 1.

14. The engine or compressor according to claim 13, further comprising a crankshaft,
    the crankshaft comprising:
    a plurality of main journal bearing surfaces,
    a plurality of connector rod journal bearing surfaces, and
    an oil feed passageway internal to the crankshaft and communicating with
    an inlet located within a main journal bearing surface and
    an outlet located within a further main journal bearing surface or within a connector rod journal bearing surface.

15. The engine or compressor according to claim 14, wherein the oil feed passageway communicates with a plurality of outlets located within journal bearing surfaces and/or connector rod journal bearing surfaces.

16. The engine according to claim 15, wherein at least one of the outlets is located within the main journal bearing surface.

17. A vehicle comprising a bearing arrangement according to claim 1.

* * * * *